United States Patent
Pilatowicz et al.

(10) Patent No.: US 6,195,840 B1
(45) Date of Patent: Mar. 6, 2001

(54) TWO-PIECE DECO LEVER HUB

(75) Inventors: Edward J. Pilatowicz, Woodland Hills; Remigio M. Chica, Northridge; Charles M. Hamill, Pacoima, all of CA (US)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/377,980

(22) Filed: Aug. 20, 1999

(51) Int. Cl.[7] ............................. F16L 5/00; F16K 35/00
(52) U.S. Cl. ................................ 16/441; 16/DIG. 30
(58) Field of Search .......................... 16/441, DIG. 30, 16/DIG. 41; 251/355, 291, 292; 74/532, 533, 553, 548; 403/361, 369, 359.6; 137/359

(56) References Cited

U.S. PATENT DOCUMENTS

| | | |
|---|---|---|
| 302,022 | 7/1884 | Peck . |
| 638,611 | 12/1899 | Totham . |
| 1,055,646 | 3/1913 | Mossberg . |
| 1,605,457 | 11/1926 | Muend . |
| 1,654,550 | 1/1928 | Muend . |
| 1,847,917 | 3/1932 | Binns . |
| 2,966,924 | 1/1961 | Young . |
| 3,026,898 | 3/1962 | Weller . |
| 4,616,673 * | 10/1986 | Bondar ................................ 16/441 X |
| 4,766,642 * | 8/1988 | Gaffney et al. ......................... 16/441 |
| 4,823,435 * | 4/1989 | Chappuis ................................ 16/441 |
| 4,961,443 | 10/1990 | Buccicone et al. . |
| 4,991,461 * | 2/1991 | Sennett et al. ......................... 74/553 |
| 5,257,645 | 11/1993 | Scully et al. . |
| 5,826,788 | 10/1998 | Redding . |

* cited by examiner

Primary Examiner—Robert J. Sandy
(74) Attorney, Agent, or Firm—Edward D. Murphy; John D. Del Ponti

(57) ABSTRACT

A hub assembly for a faucet handle having an interconnectable top member and skirt member. The top member having a bottom portion of reduced diameter with an external recess formed therein a short distance up from its bottom. The skirt member having an upper opening sized to receive the bottom portion of the top member. Resilient members being formed in the skirt member to extend downwardly and into the upper opening. The resilient members being engageable in the recess of the bottom portion releasably to connect the top member and the skirt.

7 Claims, 6 Drawing Sheets

TWO-PIECE DECO LEVER HUB

BACKGROUND OF THE INVENTION

This invention relates to a hub assembly for a faucet handle, which is made up of an interconnected top member and a skirt member. It is desirable to make the hub assembly with design and material flexibility while providing a simple and solid connection. In the prior art, a one-piece hub assembly was generally used, but if pieces were connected to each other, the same material was usually used for all of the components and/or the connection or disconnection was complex and difficult to make.

SUMMARY OF THE INVENTION

It is an object of the present invention to provide an improved hub assembly that uses two interconnected components that are of the same or different material and are snap-fitted to each other for easy connection and/or disconnection to each other. It is another object of the present invention to provide an improved hub assembly that is simple and solid to make, is flexible as to design and material, and is easy to assemble and/or disassemble.

It is another object of the present invention to provide a hub assembly that protects and operates the water valve (not shown) while providing the availability of a variety of aesthetic designs.

Other objects, features and advantages of the present invention will become apparent from the following detailed description of the invention, the appended claims and the accompanying drawings.

BRIEF DESCRIPTION OF THE DRAWINGS

In the accompanying drawings:

FIG. 7 is an enlarged partial sectional side elevational view of the encircled portion of the top member shown in FIG. 1;

DETAILED DESCRIPTION OF THE INVENTION

Figure 1:
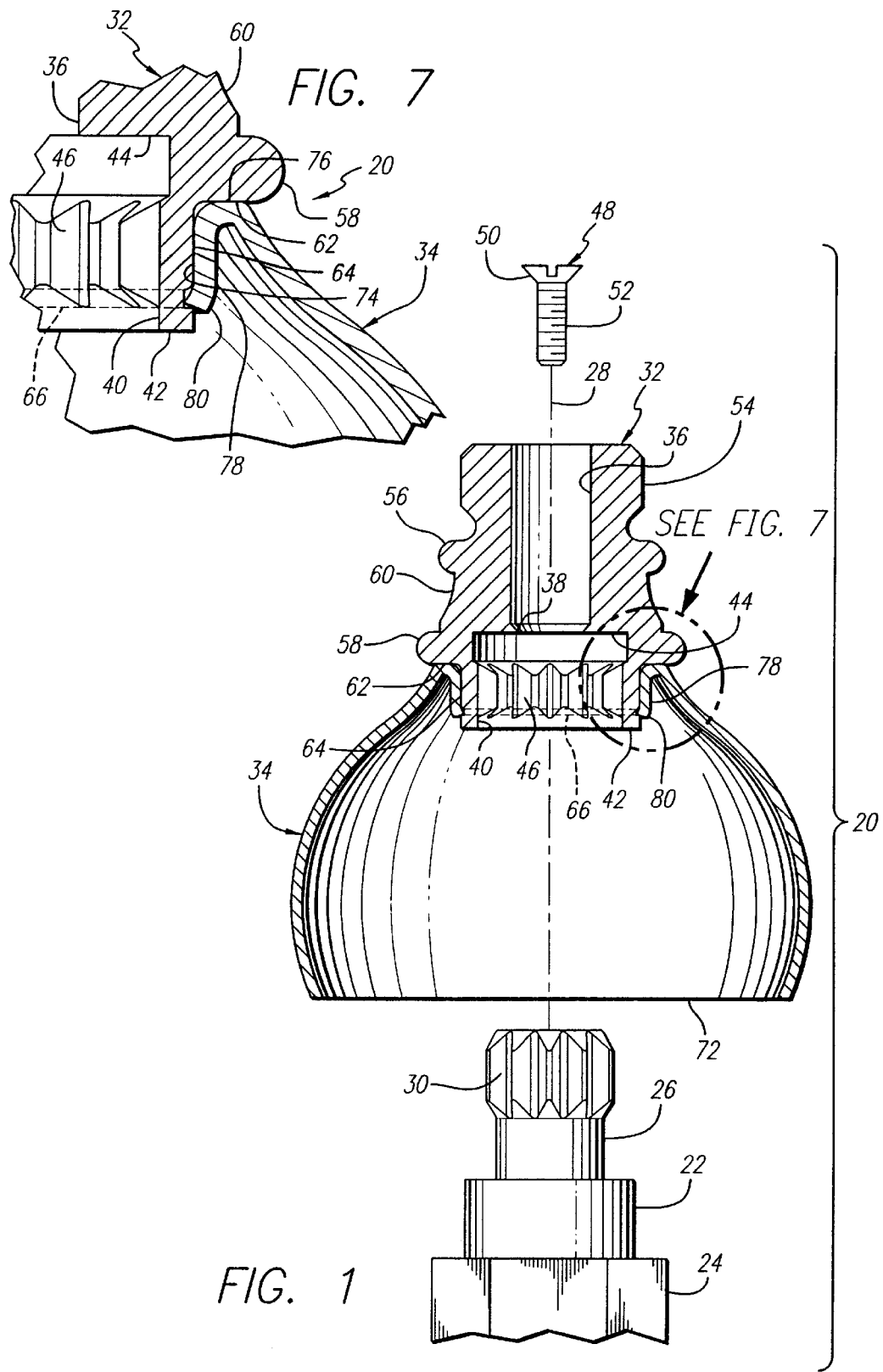
FIG. 1 is a partial exploded sectional view of a preferred (first) embodiment of the hub assembly of the present invention.

The preferred (i.e., the first) embodiment of the invention is shown in FIGS. 1 through 7, wherein FIG. 1 shows a hub assembly 20 in an exploded view thereof that depicts a conventional valve stem 22 that is connected to a water valve (not shown) through a coupling 24. The upper end 26 of the valve stem 22 has a tapped hole (not shown) formed about an axis 28, and a plurality of splines 30 formed on the upper end 26 of the valve stem 22. Rotation of the valve stem 22 controls the flow of water (hot or cold) through the water valve.

The hub assembly 20 shown in FIG. 1 is made principally of two components, namely, a top member 32 and a skirt member 34 that are interconnected to each other, as is more fully explained hereinafter. The two components can be made of the same or different materials and the design of each component can be varied as desired. Some examples of different materials that may be used for either or both of the components are brass, plastic, steel, zinc or the like, or a coating or film of suitable material applied to one of these materials. Likewise, the designs of the components can be varied, as is shown in the several embodiments of the present invention. In each case, a handle will be connected to the hub assembly 20 to suitably operate the water valve and the hub assembly 20 will enclose the water valve in an aesthetically pleasing design that also protects the water valve. In some installations, a first material and/or design may be used and, subsequently, a second or third material and/or design may be substituted therefor, as desired.

The top member 32 of the handle assembly 20, as shown in FIG. 1, has a countersunk central opening 36 formed about the axis 28 with a tapped reduced diameter at 38 formed at the lower end of the opening 36 which continues into an enlarged opening 40 that extends upwardly from a bottom end 42 to terminate in a flat top 44. The enlarged opening 40 has a plurality of splines 46 formed therein of a diameter substantially equal to the diameter of the splines 30 of the upper end 26 of the valve stem 22.

Figure 6:
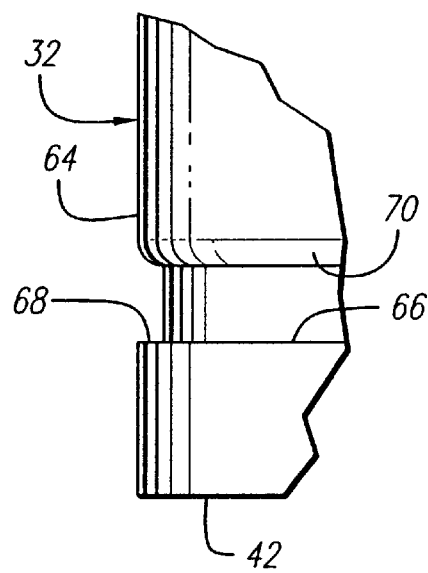
FIG. 6 is an enlarged side elevational view of the encircled portion of the top member shown in FIG. 5.

The splines 30 of the upper end 26 of the valve stem 22 will be operatively disposed within the spline 46 of the top member 32. The connection is fixed by a flat headed screw 48 which has a slotted head 50 that is tapered inwardly and downwardly to a reduced diameter threaded section 52 that will be threadedly engaged in a tapped hole (not shown) formed in the top of the upper end 26 of the valve stem 22 so that, in connected position, the screw 48 will have its head 50 engage the countersink 38 so as to affix the valve stem 22 to the top member 32 of the handle assembly 20. A handle (not shown) will be suitably connected to the top member 32 at the splined upper portion 54, best seen in FIG. 5, to operated the valve stem 22 and the water valve in a conventional manner. A pair of vertically spaced ribs, with upper rib 56 and a lower rib 58 separated by a vertical portion 60 that provides a smooth transition from the bottom of the rib 56 to a larger diameter vertical section that terminates in the top of the rib 58. The rib 58 has a flat bottom 62 that terminates in a cylindrical bottom portion 64 of the top member 32 having a reduced diameter that extends vertically and downwardly therefrom. An annular recess 66 is formed in the bottom portion 64 a short distance up from the bottom 42 thereof. FIG. 6 shows an enlarged illustration of the recess 66 is formed between a flat bottom edge 68 formed perpendicular to the vertical wall of the bottom portion 64 and a rounded top edge 70 that extends into the recess 66 from the vertical wall of the bottom portion 64.

Figure 2:
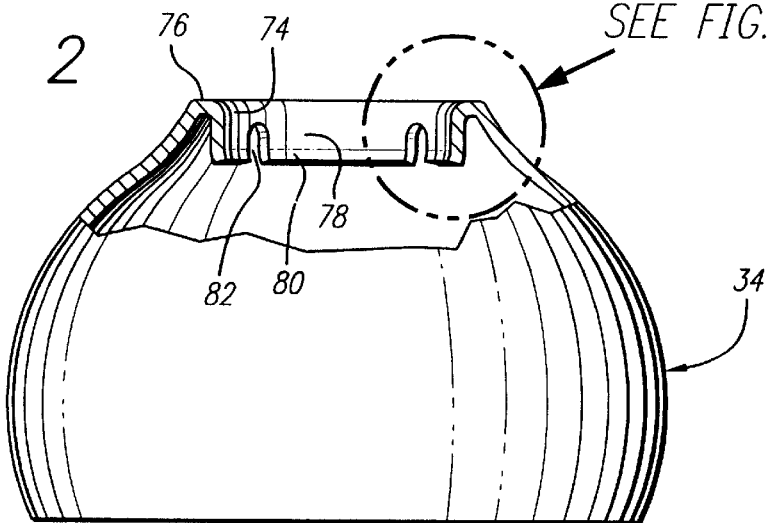
FIG. 2 is a partial broken away and sectional side elevational view of the skirt member of the preferred embodiment of the hub assembly of the present invention.
Figure 3:
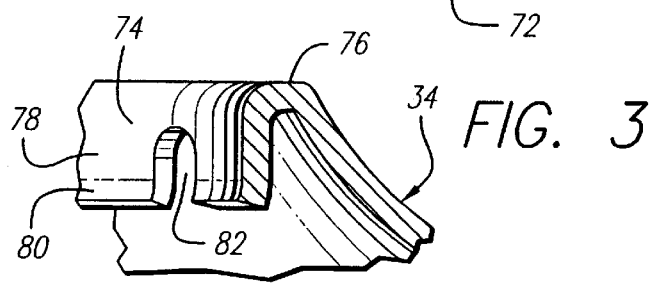
FIG. 3 is an enlarged side elevational view of the encircled portion of the skirt member shown in FIG. 2.
Figure 4:
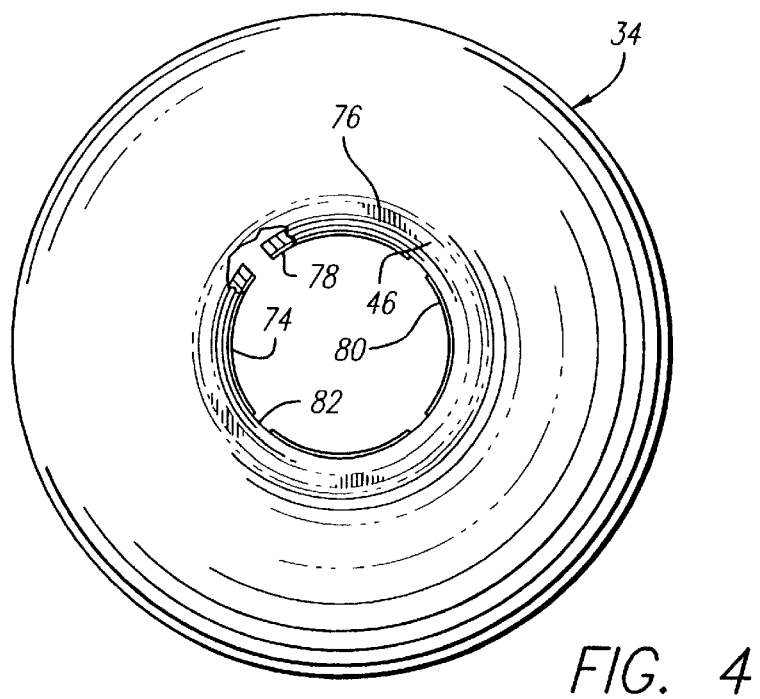
FIG. 4 is a top plan view, partly in section, of the skirt member of the preferred embodiment of the hub assembly of the present invention.
Figure 5:
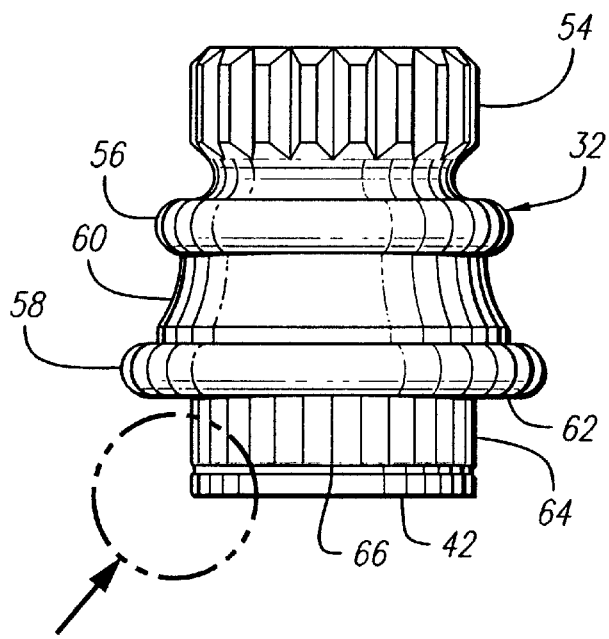
FIG. 5 is a side elevational view of the top member of the preferred embodiment of the hub assembly of the present invention.

The skirt member 34, shown in FIGS. 2, 3 and 4, has a bulbous shape with a circular bottom edge 72 and a smaller circular upper opening 74 of substantially the same diameter as that of the bottom portion 64 of the top member 32. The upper opening 74 has a top edge 76 which turns downwardly to form a plurality of resilient members or fingers 78 that have a bent end 80 that extends in the direction of the opening 74. The resilient members 78 are separated by a cutout space 82 that is formed therebetween to extend upwardly from the end 80 to terminate below the top edge 76.

The handle assembly 20 can have the top member 32 and the skirt member 34 interconnected or disconnected to each other, as is shown in FIGS. 1 and 7, by disposing the bottom portion 64 into the upper opening 74 and extended downwardly until the top edge 76 of the skirt member 34 contacts the flat bottom 62 of the rib 58 of the top member 32. When this occurs, the bent end 80 of the resilient member 78 will have entered the recess 66 of the bottom portion 64 of the top member 32. The resilient members 78 will yield outwardly during the downward descent of the bottom portion 64 until the bent end 80 enters the recess to spring the resilient members 78 back into locking position whereby the skirt member 34 and the top member 32 are interconnected. This connection is deemed a snap-fit and, with sufficient force, the components may be disconnected from each other. The bottom portion 64 and the resilient members 78, as best shown in FIG. 7 in connected position, are connected substantially along the full length of the bottom portion 64 that lies from the rounded top edge 70 of the recess 66 to the bottom 62 of the rib 58. The two contact points between the top member 32 and the skirt members namely at the bottom 62 of the rib 58 and the top edge 76 of the upper opening 74, and along the length of the bottom portion 64 and the resilient members 78.

Figure 8:
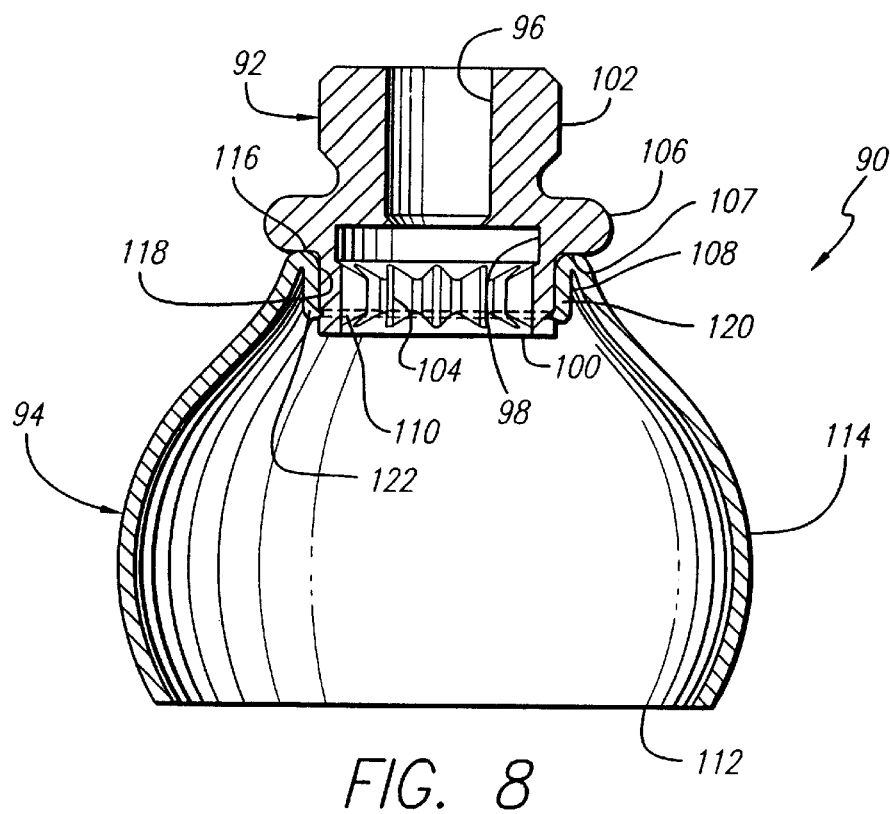
FIG. 8 is a sectional side elevational view of a second embodiment of the hub assembly of the present invention.

In FIG. 8, a second embodiment of the present invention is shown and the components are functionally, if not physically, similar to the components of the first embodiment of the present invention described hereinbefore in FIGS. 1 through 7. Once again, the materials and the designs may vary from those shown and described in the first embodiment of the present invention and the materials used may be coated or uncoated in any suitable combination and made of any suitable material. Likewise, the design shown is only one of many possible designs. The handle assembly 90 is made up of a top member 92 and a skirt member 94. The top member 92 has a countersunk central opening 96 that is counterbored at 98, counterbore extends upwardly from a bottom 100 thereof. External splines 102 are formed at the upper end of the top member 92 and internal splines 104 are formed in the counterbore 98. A handle (not shown) will be connected to the splines 102 and the splined upper end of a valve stem of a water valve (not shown) will be connected to the internal spline 104 for conventional operation of the water valve by the handle. The top member has a rib 106 formed midway of its length below the splines 102 with a bottom edge 107, and above a cylindrical bottom portion 108, that has an external recess 110 formed near the bottom 100. The skirt member 94 is bulbous and shaped similar to the skirt member 34 of the first embodiment of the present invention. The skirt member 94 has a flat bottom 112 and a bulbous side 114 that terminate at a top 116 of an upper opening 118 of substantially the same diameter as that of the bottom portion 108 of the top member 92 which is disposed in the upper opening 118. A plurality of resilient members or fingers 120 extend downwardly to yieldably contact the bottom portion 108 above the recess 110. The lower edge 122 of the resilient members 120 is bent inwardly to be engaged in the recess 110 upon the top 116 of the skirt member 94 contacting the bottom 100 of the rib 106 of the top member 92. This provides the same snap-fit that was described more fully in connection with the first embodiment of the present invention so as to interconnect the top member 92 to the skirt member 94 in a solid and stable manner while permitting the components to be easily disconnected from each other whenever desired for purposes of maintenance or to change the material and/or design of one or both of the components of the handle assembly 90.

Figure 9:
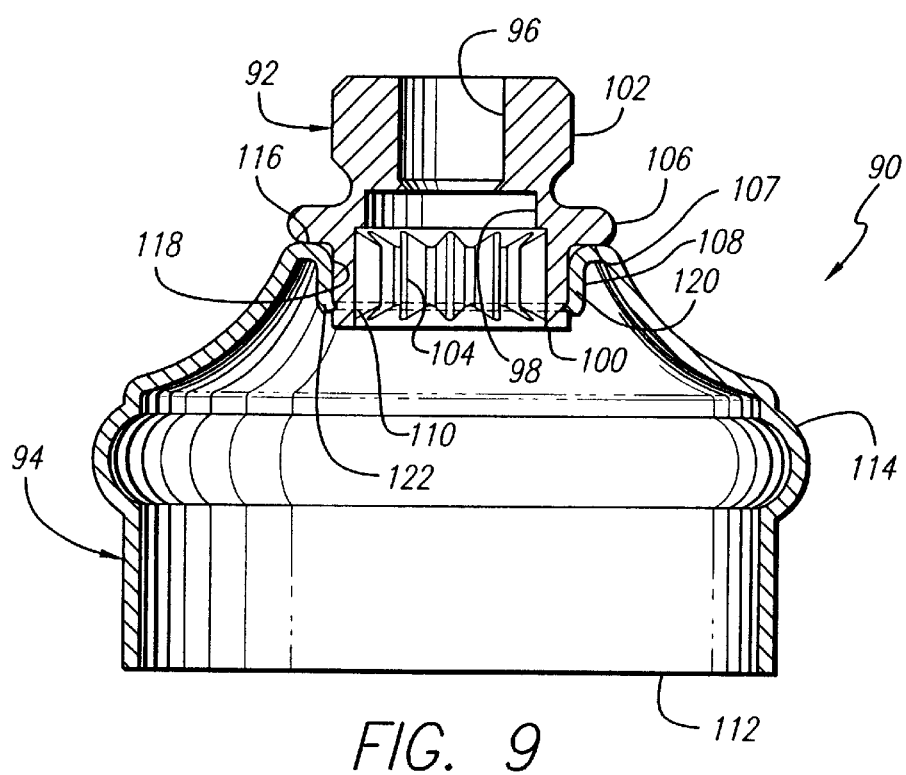
FIG. 9 is a sectional side elevational view of a third embodiment of the hub assembly of the present invention.
Figure 10:
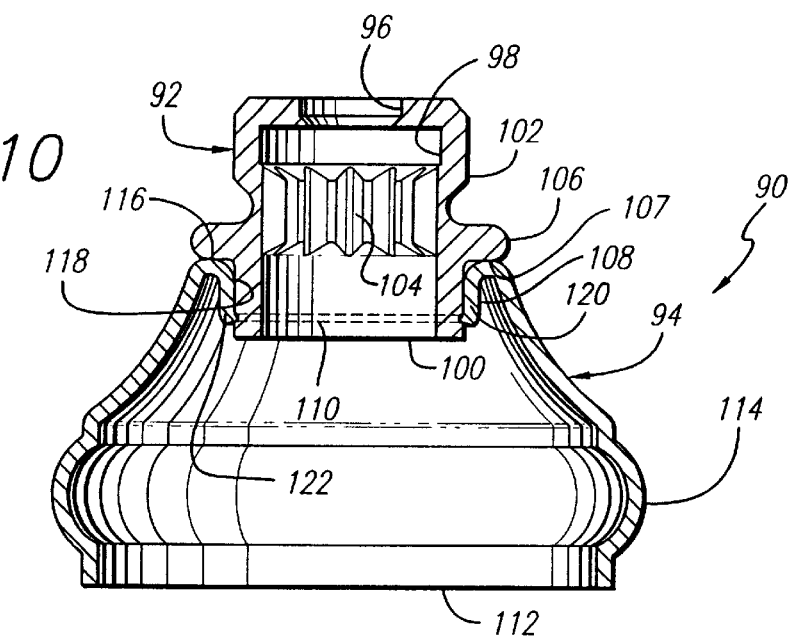
FIG. 10 is a sectional side elevational view of a fourth embodiment of the hub assembly of the present invention.
Figure 11:
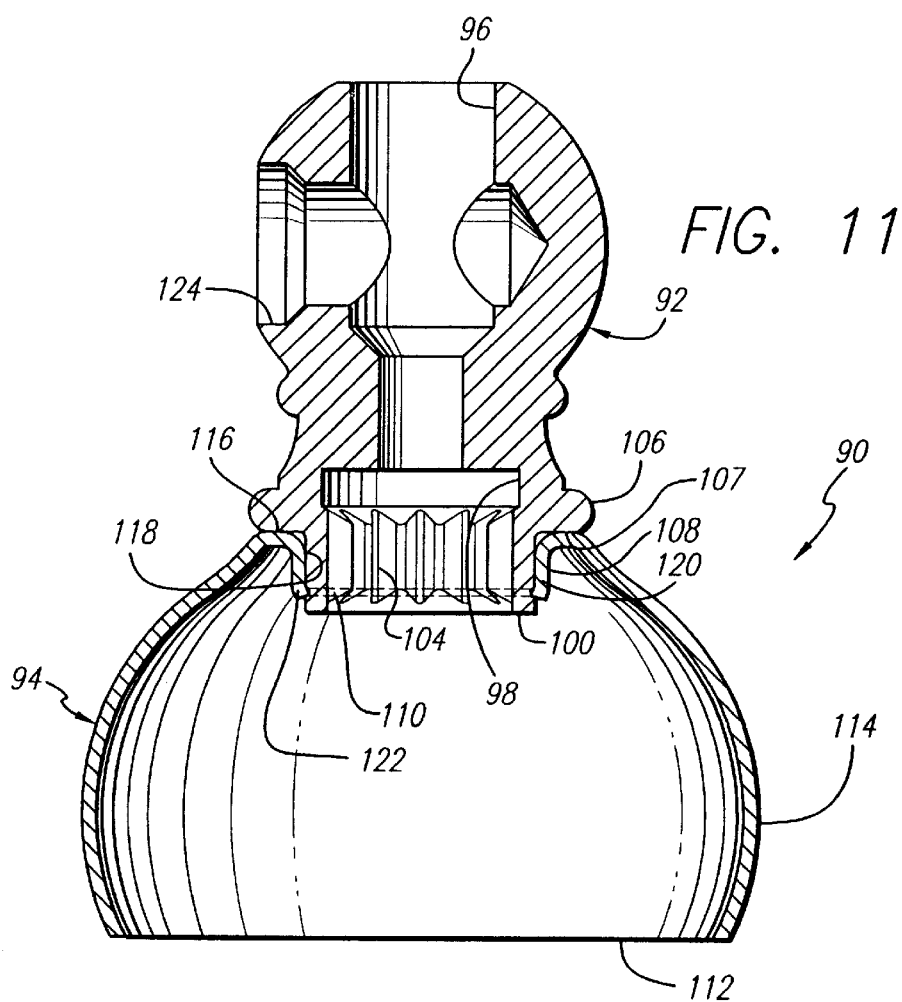
FIG. 11 a sectional side elevational view of a fifth embodiment of the hub assembly of the present invention.
Figure 12:
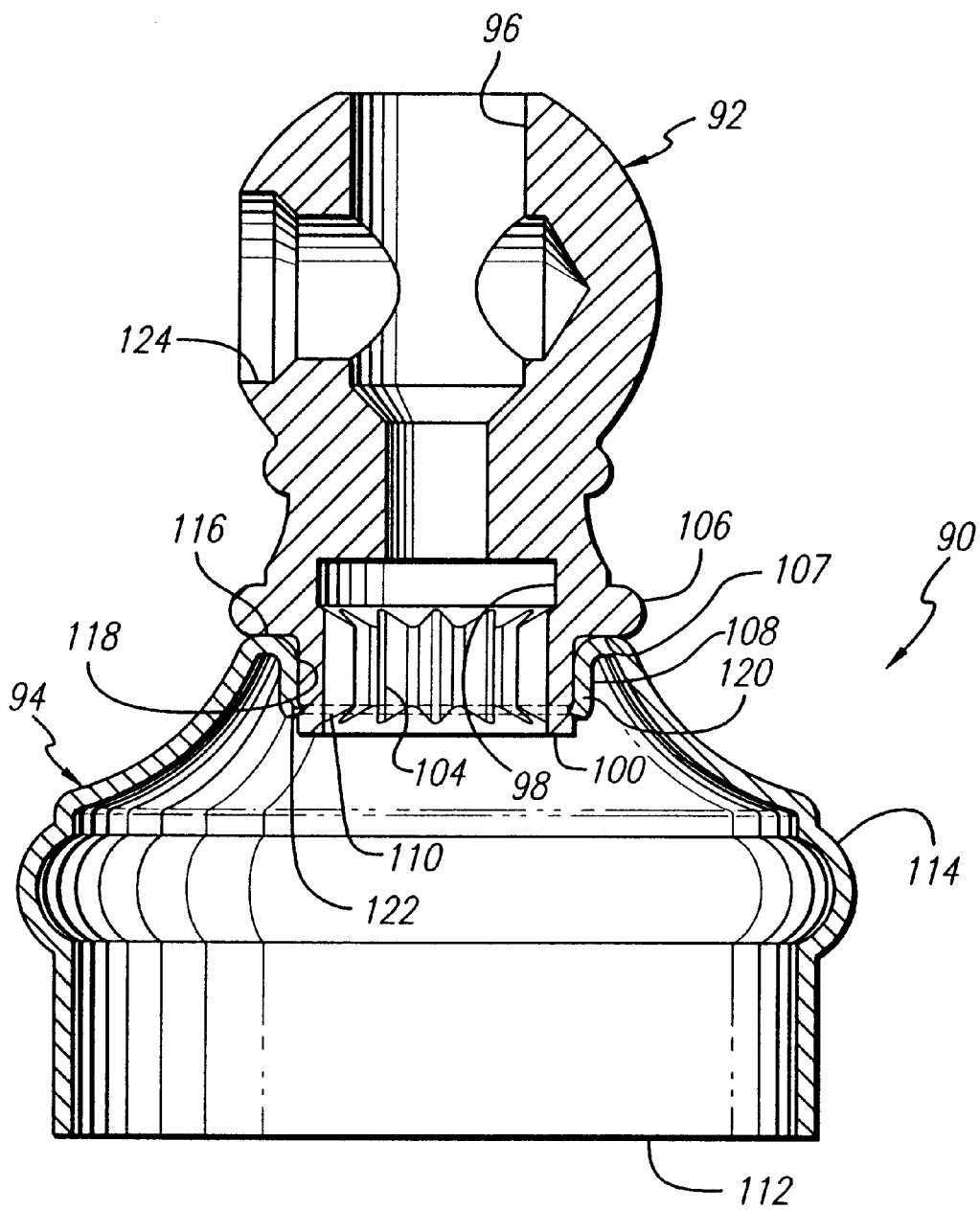
FIG. 12 is a sectional side elevational view of a sixth embodiment of the hub assembly of the present invention.

In most instances, the same reference characters as was for the second embodiment of the present invention will be used for the third (FIG. 9), fourth (FIG. 10), fifth (FIG. 11) and sixth (FIG. 12) embodiments of the present invention in that, in each of these embodiments of the present invention, though the designs are different and the materials may or may not be different, the invention is substantially the same and the handle assembly 90 in those instances will have interconnected components of a top member 92 and a skirt member 94. However, in some instances, the reference characters will be different, as will be indicated hereinafter.

In the third (FIG. 9) and fourth (FIG. 10) embodiments of the present invention, a handle (not shown) will be connected at splines 102, while in the fifth (FIG. 11) and sixth (FIG. 12) embodiments, a lever (not shown) may be screw connected in a tapped hole 124 which intersects with the central opening 96 of the top member 92. Whether the water valve is operated by a handle or a lever is immaterial in that it will function in the same conventional manner.

It will be appreciated that the above described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

What is claimed is:

1. A hub assembly for a faucet handle comprising:
   a. a top member;
   b. the top member having a bottom portion of reduced diameter;
   c. an annular recess formed in the bottom portion;
   d. a skirt member having an upper opening sized to receive the bottom portion of the top member;
   e. the upper opening having at least one downturned resilient member extending beyond the upper opening; and
   f. the top member connectable to the skirt member upon the at least one resilient member of the skirt being disposed in the recess of the bottom portion.

2. The hub assembly claimed in claim 1 wherein the resilient member having a plurality of circumferentially spaced resilient fingers engageable in the recess of the bottom portion to releasably clamp the skirt member and the top member together.

3. The hub assembly claimed in claim 2 wherein:
   a. the bottom portion of the top member extends upwardly from the bottom thereof to terminate in an outwardly extending annular flange; and
   b. the top of the upper opening of the skirt engages the annular flange when the top member is joined with the skirt member.

4. A hub assembly for a handle operating a faucet valve comprising:

a. a top member adapted to be operatively connected to the valve;

b. the top member having an external bottom portion of reduced diameter;

c. an inwardly extending recess formed on the bottom portion;

d. a skirt member having an upper opening sized to receive the bottom portion of the top member; and e. the upper opening having at least one downturned resilient member disposable in the recess of the bottom portion whereby the top member will be detachably connected to the skirt member.

5. The hub assembly claimed in claim 4 wherein the resilient member having a plurality of fingers spaced about the circumference, yieldable upon engaging the bottom portion and adapted to expand into contacting engagement with the bottom portion on entering the recess thereof.

6. The hub assembly claimed in claim 5 wherein:

a. an annular flange defines an upper limit of the bottom portion;

b. the recess of the bottom portion is spaced from the annular flange by a preset distance;

c. a top is formed on the upper opening of the skirt member;

d. the resilient member defining a plurality of fingers extending downwardly therefrom and in the direction of the opening; and e. the top of the skirt member to contact the annular flange releasably to connect the fingers in the recess.

7. The hub assembly claimed in claim 6 wherein:

a. the top member having an axial opening with a lower portion and an upper portion;

b. an enlarged splined opening formed in the lower portion of the axial opening; and c. the upper portion of the axial opening being countersunk at about midsection of the axial opening.

\* \* \* \* \*